Aug. 28, 1934.                F. S. KINKEAD                1,971,686
              TELEGRAPH SIGNAL TRANSMITTING CIRCUITS
                    Filed Feb. 3, 1932        2 Sheets-Sheet 1
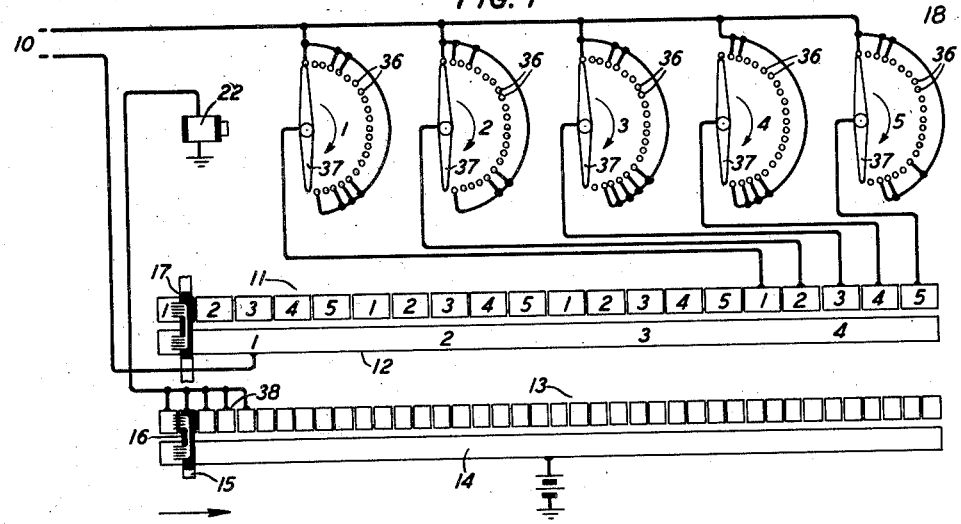
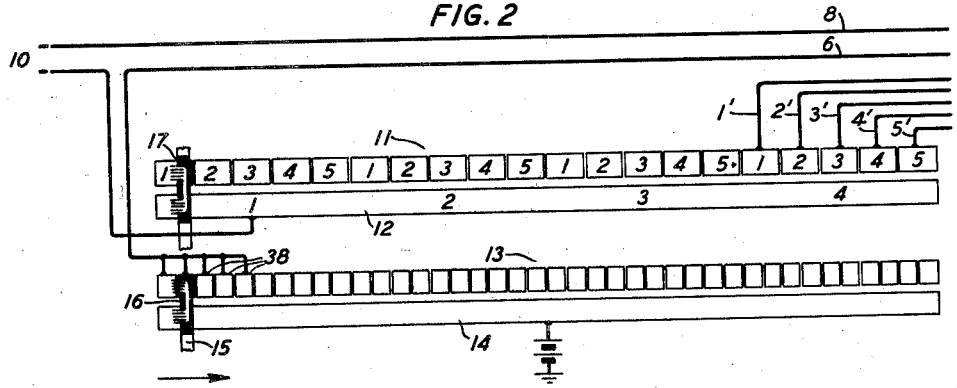
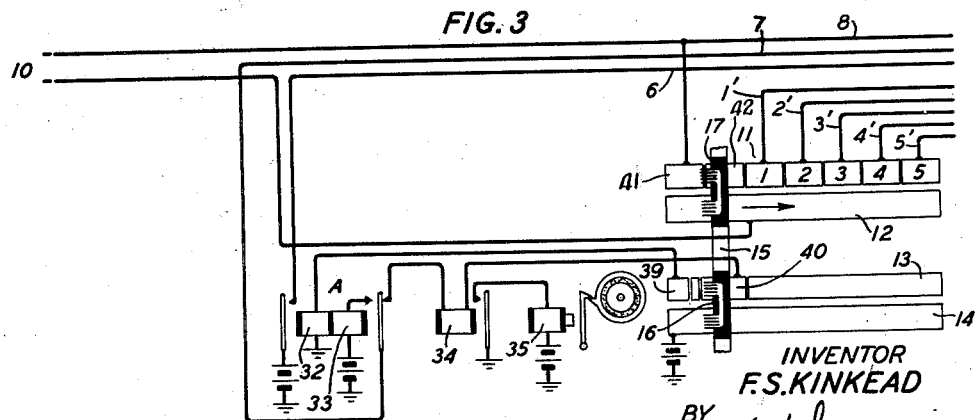
INVENTOR
F.S.KINKEAD
BY
ATTORNEY Aug. 28, 1934.   F. S. KINKEAD   1,971,686
TELEGRAPH SIGNAL TRANSMITTING CIRCUITS
Filed Feb. 3, 1932   2 Sheets-Sheet 2

INVENTOR
F. S. KINKEAD
BY
E. V. Griggs
ATTORNEY

Patented Aug. 28, 1934

1,971,686

UNITED STATES PATENT OFFICE 1,971,686

TELEGRAPH SIGNAL TRANSMITTING CIRCUITS

Fullerton S. Kinkead, New York, N. Y., assignor to Bell Telephone Laboratories, Incorporated, New York, N. Y., a corporation of New York Application February 3, 1932, Serial No. 590,557

1 Claim. (Cl. 177—381)

This invention relates to circuit arrangements for periodically transmitting a series of signals and more particularly to such circuit arrangements wherein a continually repeated series of signals is transmitted into a communication line for testing purposes.

An object of this invention is to provide circuit means for periodically transmitting a series of signals in a communication circuit in a convenient and effective manner.

Heretofore automatic tape transmitters have been employed for periodically transmitting into a telegraph circuit a series of signals for testing purposes. These transmitters are actuated by a tape perforated in accordance with a predetermined code which controls the closing and the breaking of a plurality of contacts in the transmitter. U. S. Patents 1,298,440, granted to G. R. Benjamin, March 25, 1919, and 1,460,357, granted to E. E. Kleinschmidt, June 26, 1923, disclose automatic tape transmitters of this type.

In using such transmitters it is customary where the same characters are repeated for testing purposes to use the same tape over and over again. The perforated tape soon becomes worn and tears as the selecting fingers in the transmitters continually exert pressure upon the parchment. Consequently, incorrect messages are transmitted by the worn tape. The short life of the tape and the unreliable operation of the automatic transmitter due to wearing of the tape are factors which make it highly desirable to provide a more efficient method of transmitting code signals for test purposes.

In accordance with the principles underlying this invention, a rotary selector arrangement is employed in combination with a rotary distributor to transmit various combinations of signals over a telegraph circuit. One or more rotary selectors may be utilized depending upon the number of signals in the series which is to be continually repeated into the communication line. Each selector comprises a plurality of rows of segments arranged in a semi-circle, each segment corresponding to an impulse of a signal to be transmitted. The segments of all rows in a selector are connected to one side of the telegraph circuit in various combinations so as to determine the character and sequence of the signals which are to be transmitted. Associated with each row is a brush connected to a segment on the transmitting distributor. A common ring of this distributor is connected to the other side of the telegraph circuit. As the brush arms of the distributor rotate, a local circuit advances the rotary selector one step after each signal is transmitted. If there are more signals in the desired series than there are corresponding segments in the rotary selector arrangement, more selectors with additional segments may be provided to operate in sequence.

This system may be used in connection with multiplex or start-stop circuits. When used with a multiplex channel circuit, the selector brushes will be connected through the associated segment of the desired channel and the stepping magnets of the rotary selector will be connected to segments of a local ring of the distributor.

A feature of this invention is the circuit arrangement for stepping the brushes of a plurality of rotary selectors in sequence.

Another feature of this invention is the start-stop arrangement for insuring that the transmitting brush assembly does not start until after all stepping magnets of all rotary selectors have returned to normal.

The invention may be more fully understood from the following description and accompanying drawings which illustrates several embodiments of this invention as applied to both multiplex and start-stop telegraph systems.

Fig. 1 illustrates a simple form of the invention using one rotary selector connected to one channel of the multiplex telegraph system;

Figs. 2 and 4 illustrate an embodiment of the invention using a plurality of selectors adapted to transmit a long series of signals over a multiplex channel circuit;

Figs. 3 and 4 illustrate another embodiment of the invention using several selectors adapted to transmit a long series of signals over a start-stop telegraph system.

Figure 4:
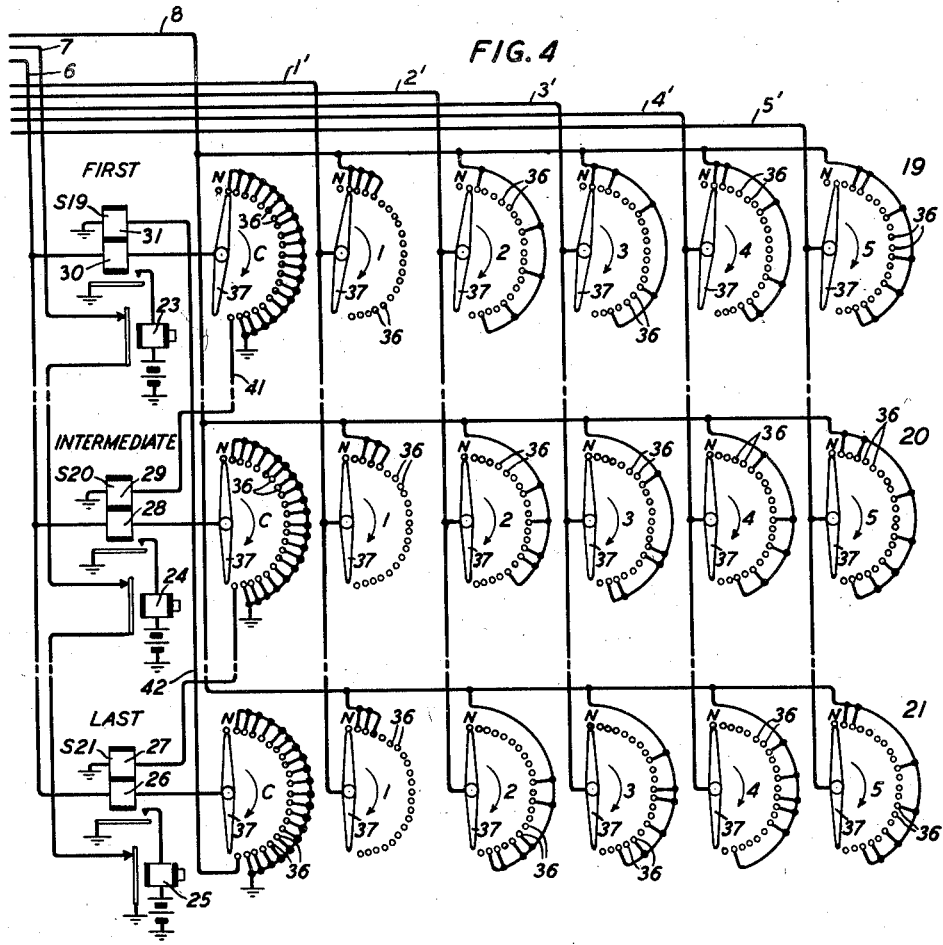

Fig. 1 shows a simple embodiment of the invention comprising a rotary selector 18 having semi-circular rows of segments 1, 2, 3, 4, and 5, each comprising insulated segments 36, a brush arm 37 associated with each row, and a stepping magnet 22 adapted to simultaneously advance all the brush arms associated with the selector one segment at a time, a multiplex rotary distributor having rings 11, 12, 13 and 14, a rotating brush arm 15 carrying two sets of brushes 16 and 17 adapted to pass over said distributor rings. The distributor, as shown, provides four multiplex channels with the transmitter connected to the fourth channel.

Assume that the stepping magnet 22 advances the selector brush arms 37 to the position shown as distributor brush 16 passes over segments 38 of ring 13. Then, as brush arm 15 advances to the fourth channel and brush 17 passes over the segments 1 to 5 of the distributor ring 11 associated with the fourth channel, a telegraph signal will be transmitted to line 10, the character of which is determined by the connections of the segments of rows 1 to 5 of the selector. After this signal has been transmitted, brush 16 will again connect segments 38 of distributor ring 13 to ring 14 and actuate magnet 22 which will advance the selector brush arms 37 to the next position where the above operations are repeated. Thus each position of the selector determines the character of a signal to be transmitted by the distributor and after each signal is transmitted, the selector is advanced to the next position where new connections are made to the distributor segment to enable the distributors to transmit the desired signal next. After one of the ends of the selector brushes has advanced over all the segments, the other end is just ready to start passing over the segment so that the series of signals will be automatically and continuously repeated.

Figure 5:
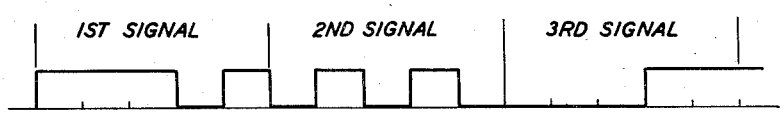
Fig. 5 illustrates the first three signals of the series as transmitted by the arrangement shown in Fig. 1.

Fig. 5 illustrates the character of the first three signals. With the selector in the position shown in Fig. 1 and brush 17 passing over segment 1, of ring 11, associated with the fourth multiplex channel, a circuit path may be traced from one side of the line 10 to the first segment of row 1 of the selector through the associated brush to segment 1 of distributor ring 11 associated with the fourth channel of the distributor through brush 17 to ring 12 to the other side of the line. A similar circuit may be found for the following distributor segments 2, 3 and 5 through the first segment of arcs 2, 3 and 5, respectively. However, since the first segment of row 4 of the selector segment is not so connected, no such path exists during the fourth impulse interval of this signal. Thus, the first signal is composed of three closed impulse intervals, an open interval and then another closed impulse interval. The second impulse as illustrated in Fig. 5 and as the selector segments of Fig. 1 are shown connected, may readily be seen to be composed of an open, a closed, an open, a closed and then an open impulse interval. In order to send any desired series of signals it is only necessary to make proper connections from line 10 to the segments of the selector.

Line 10 extends to telegraph apparatus under test. Line 10 may be connected directly to this apparatus or may extend through any switching or patching circuits to the apparatus under test. These transmitters may be used to test many different types of telegraph apparatus. The methods of testing the different types of apparatus vary acording to the type of apparatus under test and since these types of apparatus and methods of testing them form no part of this invention and since the many possible ways of connecting this test signal transmitter through line 10 to the apparatus under test forms no part of this invention, details of the apparatus under test, the method of testing this apparatus and the interconnecting circuits are not described in this specification.

However, in case it is desirable to send more signals in the series than there are positions on the selector, it is necessary to provide more than one selector.

Figs. 2 and 4 illustrate one method of doing this. Fig. 2 shows a four-channel multiplex distributor having segmented rings 11 and 13 and solid rings 12 and 14, a rotating brush arm 15 carrying brushes 16 and 17 connected to line 10 and to Fig. 4 through leads 1' to 5', 6 and 8. Fig. 4 shows the associated selectors 19, 20 and 21 having stepping magnets 23, 24 and 25, respectively. Each selector has a bank of segments 36 arranged in six semi-circular arcs 1 to 5 and C. Associated with each arc is a double-ended brush arm 37 so designed that when the brushes of one end pass off the last segment, the brushes at the other end pass on to the first segment. Auxiliary relays S19, S20 and S21 are associated with selectors 19, 20 and 21, respectively.

Assume that brush 16, as shown in Fig. 2, in passing over segments 38 of ring 13 has advanced the selector switch 19 in Fig. 4 to the position shown. As the distributor brush arm 15 carries brush 17 over segments 1 to 5 of ring 11 associated with the fourth multiplex channel, a telegraph signal is transmitted to line 10, the character of the signal being determined by the connection of the segments of the selector to line 10 as described for Fig. 1. When the distributor brush 16 again passes over segments 38 of ring 13, a circuit is completed from battery through the distributor ring 14, brush 16, segments 38 of ring 13, lead 6 of Fig. 4, the winding 30 to the S19 relay associated with selector 19, selector brush 37 associated with arc C to ground on the selector segment. This operates relay S19 which in turn operates the stepping magnet 23 to advance selector 19 to the next terminal to make the proper connections to the associated distributor segments for the transmission of the next signal when the distributor brush 17 again passes over the segments 1 to 5 of ring 11 associated with the fourth multiplex channel. Thus, the selector brushes are advanced to the next set of terminals after each signal is transmitted until they are resting on the last segment. After the corresponding signal has been transmitted and the distributor brush 16 in Fig. 2 is passing over segments 38 of ring 13, a circuit may be traced from battery through distributor ring 14, brush 16, segments 38 over lead 6 to Fig. 4, through winding 30 of the S19 relay, through the selector brush associated with arc C to the last segment of arc C, over leads 41 and the next S relay winding to ground, as shown, through winding 29 of relay S20. The current flowing in this path operates both relays S19 and S20 which in turn operate the stepping magnets 23 and 24 and advances their associated selectors, respectively, to normal and to the second terminal preparatory to sending the next signal. As distributor brush 16 passes over segments 38, a circuit from battery is now completed through winding 28 of relay S20 and the brush associated with arc C of selector 20 to ground on the segment of this arc. It should be noted that all the other selectors are in their normal positions and that ground is not connected to this segment of arc C so that associated S relays cannot function to advance these selectors. Only the selector brushes off-normal will be advanced one segment each time the distributor brush 16 passes over segments 38 since this is the only selector having its brushes associated with the C arc which is resting on a grounded segment of this arc. Thus the brushes of selector switch 20 pass over its arcs one step at a time, each step being associated with one signal. When its brushes rest on the last terminal, the above action is repeated so that switch 20 is returned to normal and the next switch advanced to its next or second position after which it is stepped over its face. In this manner the brushes of each selector in turn are stepped around their respective arcs.

As the distributor brush 16 passes over segments 38 with the brushes of the last selector resting on the last set of segments, a circuit from battery over distributor rings 14, brush 16, and segments 38 of ring 13 of Fig. 2, over lead 6 to Fig. 4 through winding 26 of relay S21 through the associated brush arms to the last segment of arc C, over lead 42 and through winding 31 of relay S19 to ground causes relays S21 and S19 to operate. Relay S21 then operates stepping magnet 25 which advances selector 21 to normal. Relay S19 operates the stepping magnet 23 which advances the selector brushes of selector 19 to the position shown so that the series of signals will then be repeated.

Figs. 3 and 4 illustrate an embodiment of the invention as applied to a start-stop telegraph system. As shown a circuit may be traced from battery through the distributor ring 14, distributor brush 16, segment 40 of distributor ring 13, the winding of relay 34, break contacts of relay A over lead 7 to Fig. 4 and through the break contact of all the selector stepping magnets 23, 24 and 25 to ground. This operates relay 34 which in turn operates magnet 35 which releases the distributor brush arm 15 of Fig. 3. Brush arm 15 carries brushes 16 and 17 over the segments of rings 11 and 13. As brush 17 passes over the start segment 42 it transmits a start impulse to line 10 and as it passes over segments 1 to 5, a signal is transmitted to the line. The character of the signal is determined by the connections of line 10 through lead 8 to the segments of the selector. As illustrated in Fig. 4 with selector brushes of selector 19 resting on the second set of segments, as shown, the first impulse is a closure, the second an open impulse, the third and fourth impulses are closures and the fifth an open since the second segment of arcs 1, 3 and 4 are connected to line 10 over lead 8, while the second segments of arcs 2 and 5 are not so connected. As distributor brush 17 passes over the stop segment 41, a stop impulse is sent over line 10. While the distributor brush 16 of Fig. 3 is passing over segment 39 of ring 13, the A relay is operated over a circuit from ground through winding 32, segment 39, brush 16 and ring 14 to battery. The A relay then locks operated over a circuit from battery, through winding 33, over lead 7 to Fig. 4 and through the break contact of the selector stepping magnets 23, 24 and 25 to ground to insure that one of these selectors will advance each time relay A is operated. Relay A in operating completes the operating circuit for the S19 relay of Fig. 4 from battery, through contacts of relay A in Fig. 2 over lead 6 to Fig. 4, through winding 30 of relay S19 to ground on the segment of arc C, through the associated brush. The S19 relay then operates the stepping magnet 23 which steps the selector to the next position and also interrupts the locking circuit for relay A of Fig. 3. This allows relay A to release which opens the operating circuit of the S19 relay which releases this relay. The S19 relay in releasing releases the stepping magnet 23 which then closes its break contact, closing the circuit for again operating relay 34 to send the next signal. In this manner the selector brushes of selector 19 are stepped over its segments and selectors 19, 20 and 21 are advanced one after the other in a manner similar to that described in connection with Figs. 2 and 4 so that a series of signals which is continuously repeated is transmitted to line 10. It should be noted that the distributor brush is interlocked with the selectors so that it is not released to transmit the next signal until the selector has been fully advanced to the next position.

While the above description describes several specific forms of this invention as applied to multiplex and start-stop tlegraph systems, it is to be understood that the same results may be obtained with many different forms of embodiment and modifications without departing from the spirit of the invention as defined in the appended claim.

What is claimed is:

An automatic telegraph impulse transmitter for transmitting a series of continuously repeated telegraph test signals comprising an output circuit, several selectors, each selector having a plurality of rows of segments, selector brush arms individual to each of said rows of segments, electromagnetic means for simultaneously advancing segment by segment all of said selector brush arms associated therewith, a rotary distributor, brushes for said distributor, connections between said distributor, said selectors and said output circuit and between various combinations of said rows of segments and said output circuit for transmitting telegraph test signals the character and sequence of which is determined by the position of said selector brush arms as said brushes of said distributor pass over its face, relays individual to each of said selectors connected to said distributor and to said selectors for successively actuating said electromagnetic means each time said brushes pass over the face of said distributor so that the brush arms of the first selector pass over all of the associated segments and then the brush arms of each of the succeeding selectors pass over all their associated segments in succession.

FULLERTON S. KINKEAD.